(12) United States Patent
Pawar et al.

(10) Patent No.: US 12,477,184 B2
(45) Date of Patent: Nov. 18, 2025

(54) SYSTEM, METHOD AND COMPUTER-READABLE MEDIUM FOR RECOMMENDATION

(71) Applicant: 17LIVE Japan Inc., Tokyo (JP)

(72) Inventors: Jayneel Pawar, Tokyo (JP); Manasvi Ghelani, Tokyo (JP); Sree Lakshmi, Tokyo (JP); Nitin Srivastavea, Tokyo (JP); Abinash Sen, Tokyo (JP); Mohammad Amir, Tokyo (JP)

(73) Assignee: 17LIVE Japan Inc., Tokyo (JP)

( * ) Notice: Subject to any disclaimer, the term of this patent is extended or adjusted under 35 U.S.C. 154(b) by 49 days.

(21) Appl. No.: 18/461,213

(22) Filed: Sep. 5, 2023

(65) Prior Publication Data
US 2024/0334015 A1    Oct. 3, 2024

(30) Foreign Application Priority Data

Apr. 3, 2023   (JP) ................................. 2023-059766
May 18, 2023   (JP) ................................. 2023-082004

(51) Int. Cl.
H04N 21/466    (2011.01)

(52) U.S. Cl.
CPC ............................ H04N 21/4668 (2013.01)

(58) Field of Classification Search
CPC ......... H04N 21/4668; H04N 21/25891; H04N 21/4826; H04N 21/4667; H04N 21/251; H04N 21/44204; H04N 21/4756; H04N 21/2668; H04N 21/466; H04N 21/6582; H04N 21/4532; H04N 21/482; G06F 16/9535; G06F 3/0482
USPC ......................................................... 725/46
See application file for complete search history.

(56) References Cited

U.S. PATENT DOCUMENTS

| | | | |
|---|---|---|---|
| 10,373,176 B1 * | 8/2019 | Wei | H04N 21/26233 |
| 10,394,408 B1 * | 8/2019 | Freund | H04N 21/00 |
| 2012/0144117 A1 * | 6/2012 | Weare | G06F 12/0888 |
| | | | 711/119 |
| 2020/0092611 A1 * | 3/2020 | Sokolov | G06N 20/00 |
| 2022/0150591 A1 * | 5/2022 | Miller | H04N 21/4826 |

(Continued)

FOREIGN PATENT DOCUMENTS

| | | | | |
|---|---|---|---|---|
| CN | 108810655 A | * | 11/2018 | H04N 21/251 |
| JP | 2005-339523 A | | 12/2005 | |
| JP | 2019-164617 A | | 9/2019 | |

(Continued)

OTHER PUBLICATIONS

Notification of Reasons for Refusal dated Aug. 22, 2023, issued in corresponding Japanese Patent Application No. 2023-082004 with English translation (8 pgs.).

*Primary Examiner* — Cynthia M Fogg
(74) *Attorney, Agent, or Firm* — HDLS IPR SERVICES; Chun-Ming Shih

(57) ABSTRACT

The present disclosure relates to a system, a method and a computer-readable medium for recommendation. The method includes providing a first content according to a first recommendation logic to a user terminal of a viewer; providing a second content according to a second recommendation logic to the user terminal; obtaining interaction data from the user terminal; and adjusting an allocation of contents from the first recommendation logic and the second recommendation logic to be shown on the user terminal according to the interaction data.

10 Claims, 19 Drawing Sheets

(56) References Cited

U.S. PATENT DOCUMENTS

2023/0328323 A1\* 10/2023 Jain .................... H04N 21/4668
                                                              725/14
2024/0214637 A1\* 6/2024 He .................... H04N 21/44204

FOREIGN PATENT DOCUMENTS

| | | |
|---|---|---|
| JP | 2020-061183 A | 4/2020 |
| JP | 7217902 B1 | 2/2023 |

\* cited by examiner

Stream DB 310

| Stream ID | Distributor ID | Viewer ID |
|---|---|---|
| ST22 | 001A | SS5, SS12, SS43 |
| ST92 | 002B | TT3, TS2 |
| ... | ... | ... |

FIG. 4

User DB 312

| User ID | Points |
|---------|--------|
| 001A    | 3243   |
| 002B    | 2510   |
| SS5     | 1803   |
| ...     | ...    |

FIG. 5

Gift DB 314

| Gift ID | Awarded points | Price points |
|---------|----------------|--------------|
| TT01    | 90             | 100          |
| TE01    | 180            | 200          |
| WTS10   | 40             | 50           |
| ...     | ...            | ...          |

FIG. 6

Recommendation logic DB 350

| Logic ID | Recommendation logic/ algorithm |
|---|---|
| RL1 | Similarity matching |
| RL2 | Collaborative filtering |
| RL3 | Thumbnail recommendation |
| RL4 | Popularitybased filtering |
| RL5 | Demographicbased filtering |

FIG. 7

Interaction DB 352: clickrate data

| Viewer ID | Recommended contents | | |
|---|---|---|---|
| | by RL1 (Similarity matching) | by RL2 (Collaborative filtering) | by RL3 (Thumbnail) |
| V1 | 0.2 | 0.4 | 0.1 |
| V2 | 0.6 | 0.1 | 0 |
| V3 | 0.5 | 0 | 0.7 |

FIG. 8

Interaction DB 352: average retention length data

| Viewer ID | Recommended contents | | |
|---|---|---|---|
| | by RL1 (Similarity matching) | by RL2 (Collaborative filtering) | by RL3 (Thumbnail) |
| V1 | 2 mins | 5 mins | 1 mins |
| V2 | 7 mins | 0.5 mins | 0 |
| V3 | 6 mins | 0 | 1 mins |

FIG. 9

|       | Liked | Disliked | Total Watched |
|-------|-------|----------|---------------|
| RS1   | 2     | 0        | 3             |
| RS2   | 1     | 1        | 2             |
| Total | 3     | 1        | 5             |

FIG. 14

|               | RS1     | RS2     |
|---------------|---------|---------|
| Watched       | 60.00%  | 40.00%  |
| Liked         | 66.67%  | 33.33%  |
| Non Disliked  | 100.00% | 00.00%  |
| Average       | 75.56%  | 24.44%  |
| Slot          | 5       | 1       |

FIG. 15

SYSTEM, METHOD AND COMPUTER-READABLE MEDIUM FOR RECOMMENDATION

CROSS-REFERENCE TO RELATED APPLICATIONS

This application is based on and claims the benefit of priority from Japanese Patent Application Serial No. 2023-059766 (filed on Apr. 3, 2023) and 2023-082004 (filed on May 18, 2023), the contents of which are hereby incorporated by reference in its entirety.

TECHNICAL FIELD

The present disclosure relates to recommendations in the streaming field.

BACKGROUND

Real time interaction on the Internet, such as live streaming service, has become popular in our daily life. There are various platforms or providers providing the service of live streaming, and the competition is fierce. It is important for a platform to provide to its users their desired contents.

Japanese patent application publication JP2019-164617A discloses a system for recommending live videos to users.

SUMMARY

A method according to one embodiment of the present disclosure is a method for recommendation being executed by one or a plurality of computers, and includes: providing a first content according to a first recommendation logic to a user terminal of a viewer; providing a second content according to a second recommendation logic to the user terminal; obtaining interaction data from the user terminal; and adjusting an allocation of contents from the first recommendation logic and the second recommendation logic to be shown on the user terminal according to the interaction data.

A system according to one embodiment of the present disclosure is a system for recommendation that includes one or a plurality of processors, and the one or plurality of computer processors execute a machine-readable instruction to perform: providing a first content according to a first recommendation logic to a user terminal of a viewer, providing a second content according to a second recommendation logic to the user terminal; obtaining interaction data from the user terminal; and adjusting an allocation of contents from the first recommendation logic and the second recommendation logic to be shown on the user terminal according to the interaction data.

A computer-readable medium according to one embodiment of the present disclosure is a non-transitory computer-readable medium including a program for recommendation, and the program causes one or a plurality of computers to execute: providing a first content according to a first recommendation logic to a user terminal of a viewer; providing a second content according to a second recommendation logic to the user terminal; obtaining interaction data from the user terminal; and adjusting an allocation of contents from the first recommendation logic and the second recommendation logic to be shown on the user terminal according to the interaction data.

BRIEF DESCRIPTION OF THE DRAWINGS

FIG. 4 is a data structure diagram of an example of the stream DB 310 of FIG. 3.

FIG. 5 is a data structure diagram showing an example of the user DB 312 of FIG. 3.

FIG. 6 is a data structure diagram showing an example of the gift DB 314 of FIG. 3.

FIG. 7 is a data structure diagram showing an example of the recommendation logic DB 350 of FIG. 3.

FIG. 8 shows exemplary data in the interaction DB 352 of FIG. 3.

FIG. 9 shows exemplary data in the interaction DB 352 of FIG. 3.

FIG. 14 is a table indicating the number of live streams explored by user A

FIG. 15 is a table indicating the calculated rates for each of RS1 and RS2.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

Various recommendation methods or logics exist in streaming service platforms, such as similarity matching (matching between user and streams) logics or collaborative filtering logics. Conventionally, the recommendation logic on a platform would be updated once in a while to try to achieve better recommendations. The recommendation logic is consistent throughout the platform and all users are served with the same recommendation logic at the same time. However, different recommendation logics may work differently for different users. Traditional recommendation systems cannot serve everyone with customized recommendation logic.

The present disclosure provides systems or methods to recommend contents in a more customized manner.

Figure 1:
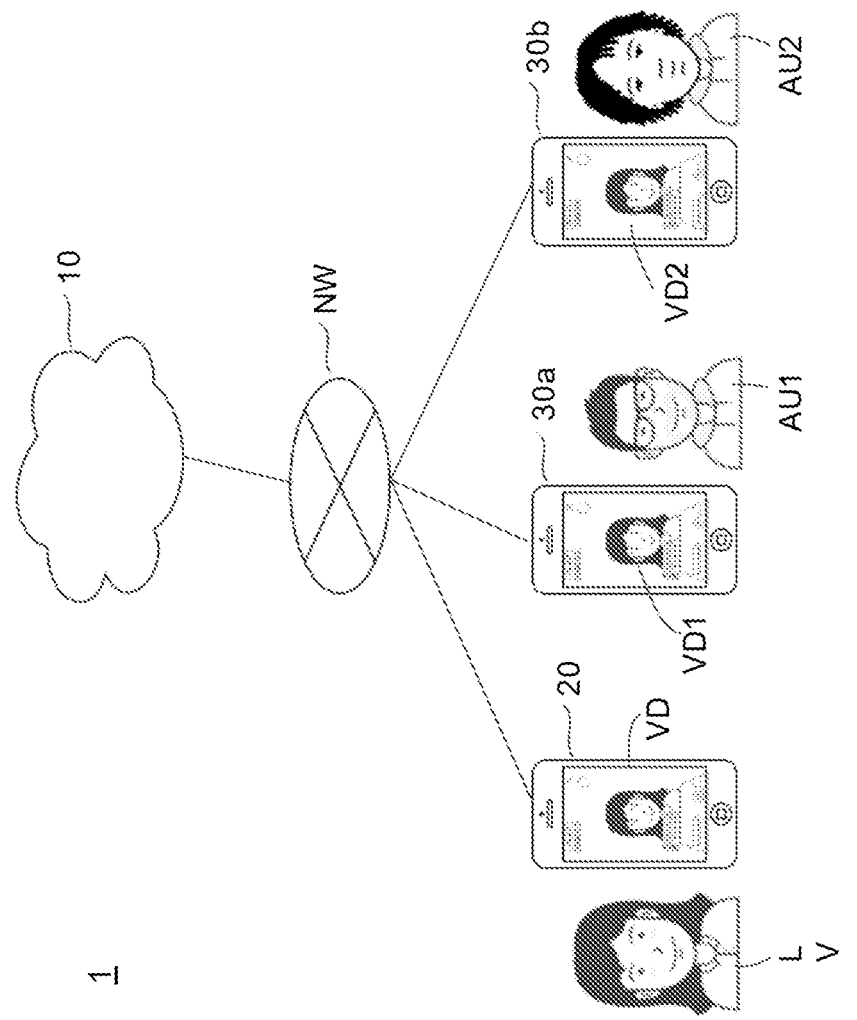
FIG. 1 shows a schematic configuration of a live streaming system 1 according to some embodiments of the present disclosure.

FIG. 1 shows a schematic configuration of a live streaming system 1 according to some embodiments of the present disclosure. The live streaming system 1 provides a live streaming service for the streaming streamer (could be referred to as liver, anchor, or distributor) LV and viewer (could be referred to as audience) AU (AU1, AU2 . . . ) to interact or communicate in real time. As shown in FIG. 1, the live streaming system 1 includes a server 10, a user terminal 20 and user terminals 30 (30a, 30b . . . ). In some embodiments, the streamers and viewers may be collectively referred to as users. The server 10 may include one or a plurality of information processing devices connected to a network NW. The user terminal 20 and 30 may be, for example, mobile terminal devices such as smartphones, tablets, laptop PCs, recorders, portable gaming devices, and wearable devices, or may be stationary devices such as desktop PCs. The server 10, the user terminal 20 and the user terminal 30 are interconnected so as to be able to communicate with each other over the various wired or wireless networks NW.

The live streaming system 1 involves the distributor LV, the viewers AU, and an administrator (or an APP provider, not shown) who manages the server 10. The distributor LV is a person who broadcasts contents in real time by recording the contents with his/her user terminal 20 and uploading them directly or indirectly to the server 10. Examples of the contents may include the distributor's own songs, talks, performances, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or send gifts via the user terminal 30. The distributor LV who is delivering the content may respond to such comments, cheers, or gifts. The response is transmitted to the viewer AU via video and/or audio, thereby establishing an interactive communication.

The term "live-streaming" may mean a mode of data transmission that allows a content recorded at the user terminal 20 of the distributor LV to be played or viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 or 30, and audio data generated using an audio input function of the user terminals 20 or 30. Video data is reproduced in the user terminals 20 and 30, so that the users can view contents. In some embodiments, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 10, and the video data received and reproduced at the viewer's user terminal are all the same video data.

In the example in FIG. 1, the distributor LV provides the live streaming data. The user terminal 20 of the distributor LV generates the streaming data by recording images and sounds of the distributor LV, and the generated data is transmitted to the server 10 over the network NW. At the same time, the user terminal 20 displays a recorded video image VD of the distributor LV on the display of the user terminal 20 to allow the distributor LV to check the live streaming contents currently performed.

The user terminals 30a and 30b of the viewers AU1 and AU2 respectively, who have requested the platform to view the live streaming of the distributor LV, receive video data related to the live streaming (may also be herein referred to as "live-streaming video data") over the network NW and reproduce the received video data to display video images VD1 and VD2 on the displays and output audio through the speakers. The video images VD1 and VD2 displayed at the user terminals 30a and 30b, respectively, are substantially the same as the video image VD captured by the user terminal 20 of the distributor LV, and the audio outputted at the user terminals 30a and 30b is substantially the same as the audio recorded by the user terminal 20 of the distributor LV.

Recording of the images and sounds at the user terminal 20 of the distributor LV and reproduction of the video data at the user terminals 30a and 30b of the viewers AU1 and AU2 are performed substantially simultaneously. Once the viewer AU1 types a comment about the contents provided by the distributor LV on the user terminal 30a, the server 10 displays the comment on the user terminal 20 of the distributor LV in real time and also displays the comment on the user terminals 30a and 30b of the viewers AU1 and AU2, respectively. When the distributor LV reads the comment and develops his/her talk to cover and respond to the comment, the video and sound of the talk are displayed on the user terminals 30a and 30b of the viewers AU1 and AU2, respectively. This interactive action is recognized as the establishment of a conversation between the distributor LV and the viewer AU1. In this way, the live streaming system 1 realizes the live streaming that enables interactive communication, not one-way communication.

Figure 2:
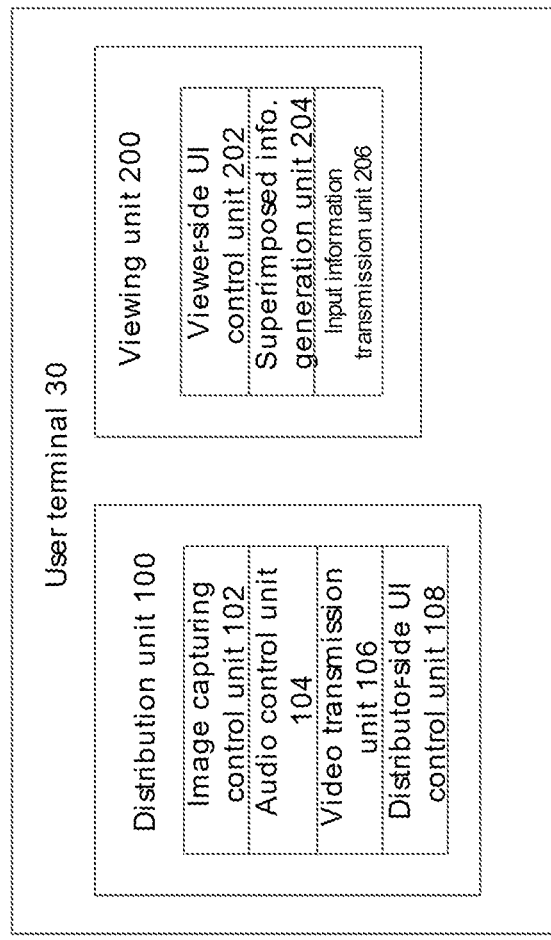
FIG. 2 is a block diagram showing functions and configuration of the user terminal 30 of FIG. 1 according to some embodiments of the present disclosure.

FIG. 2 is a block diagram showing functions and configuration of the user terminal 30 of FIG. 1 according to some embodiments of the present disclosure. The user terminal 20 has the same or similar functions and configuration as the user terminal 30. Each block in FIG. 2 and the subsequent block diagrams may be realized by elements such as a computer CPU or a mechanical device in terms of hardware, and can be realized by a computer program or the like in terms of software. Functional blocks could be realized by cooperative operation between these elements. Therefore, it is understood by those skilled in the art that these functional blocks can be realized in various forms by combining hardware and software.

The distributor LV and the viewers AU may download and install a live streaming application program (hereinafter referred to as a live streaming application) to the user terminals 20 and 30 from a download site over the network NW. Alternatively, the live streaming application may be pre-installed on the user terminals 20 and 30. When the live streaming application is executed on the user terminals 20 and 30, the user terminals 20 and 30 communicate with the server 10 over the network NW to implement or execute various functions. Hereinafter, the functions implemented by the user terminals 20 and 30 (processors such as CPUs) in which the live streaming application is run will be described as functions of the user terminals 20 and 30. These functions are realized in practice by the live streaming application on the user terminals 20 and 30. In some embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 30 includes a distribution unit 100 and a viewing unit 200. The distribution unit 100 generates video data in which the user's (or the user side's) image and sound are recorded, and provides the video data to the server 10. The viewing unit 200 receives video data from the server 10 to reproduce the video data. The user activates the distribution unit 100 when the user performs live streaming, and activates the viewing unit 200 when the user views a video. The user terminal in which the distribution unit 100 is activated is the distributor's terminal, i.e., the user terminal that generates the video data. The user terminal in which the viewing unit 200 is activated is the viewer's terminal, i.e., the user terminal in which the video data is reproduced and played.

The distribution unit 100 includes an image capturing control unit 102, an audio control unit 104, a video transmission unit 106, and a distribution-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distribution-side UI control unit 108 controls an UI (user interface) for the distributor. The distribution-side UI control unit 108 may be connected to a display (not shown in FIG. 2), and displays a video on the display by reproducing the video data that is to be transmitted by the video transmission unit 106. The distribution-side UI control unit 108 may display an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewing unit 200 receives, from the server 10 over the network NW, video data related to the live streaming in which the distributor, the viewer who is the user of the user terminal 30, and other viewers participate. The viewer-side UI control unit 202 controls the UI for the viewers. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and/or information obtained from the server 10. The input information transmission unit 206 transmits the user input obtained by the viewer-side UI control unit 202 to the server 10 over the network NW.

Figure 3:
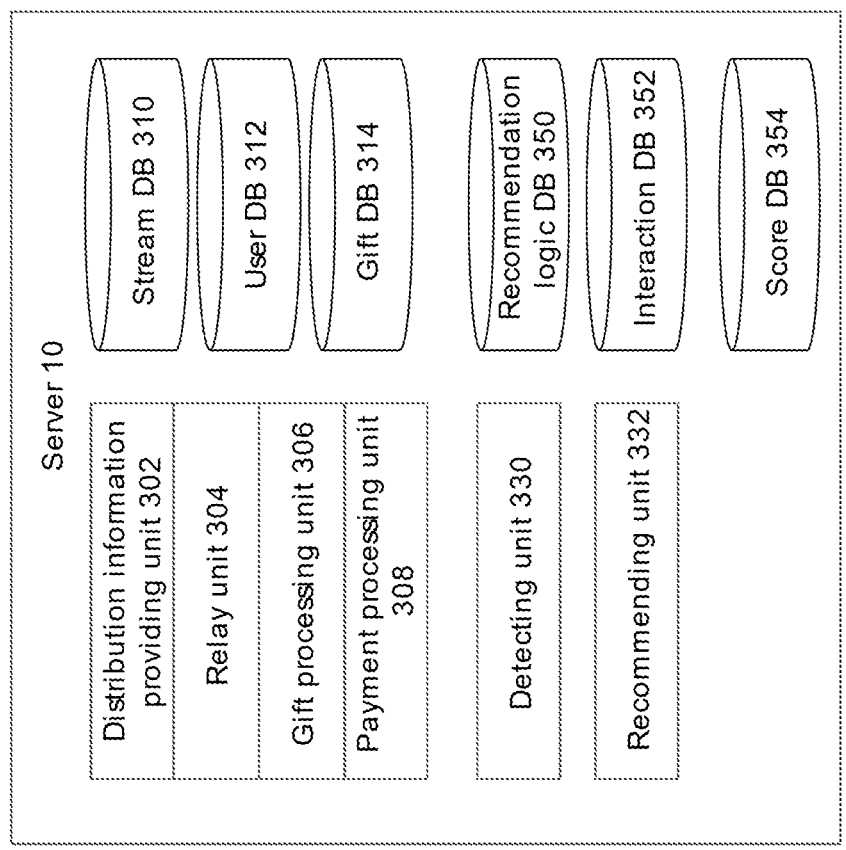
FIG. 3 shows a block diagram illustrating functions and configuration of the server of FIG. 1 according to some embodiments of the present disclosure.

FIG. 3 shows a block diagram illustrating functions and configuration of the server 10 of FIG. 1 according to some embodiments of the present disclosure. The server 10 includes a distribution information providing unit 302, a relay unit 304, a gift processing unit 306, a payment processing unit 308, a stream DB 310, a user DB 312, a gift DB 314, a detecting unit 330, a recommending unit 332, a recommendation logic DB 350, an interaction DB 352 and a score DB 354.

Upon reception of a notification or a request from the user terminal 20 on the distributor side to start a live streaming over the network NW, the distribution information providing unit 302 registers a stream ID for identifying this live streaming and the distributor ID of the distributor who performs the live streaming in the stream DB 310.

When the distribution information providing unit 302 receives a request to provide information about live streams from the viewing unit 200 of the user terminal 30 on the viewer side over the network NW, the distribution information providing unit 302 retrieves or checks currently available live streams from the stream DB 310 and makes a list of the available live streams. The distribution information providing unit 302 transmits the generated list to the requesting user terminal 30 over the network NW. The viewer-side UI control unit 202 of the requesting user terminal 30 generates a live stream selection screen based on the received list and displays it on the display of the user terminal 30.

Once the input information transmission unit 206 of the user terminal 30 receives the viewer's selection result on the live stream selection screen, the input information transmission unit 206 generates a distribution request including the stream ID of the selected live stream, and transmits the request to the server 10 over the network NW. The distribution information providing unit 302 starts providing, to the requesting user terminal 30, the live stream specified by the stream ID included in the received distribution request.

The distribution information providing unit 302 updates the stream DB 310 to include the user ID of the viewer of the requesting user terminal 30 into the viewer IDs of (or corresponding to) the stream ID.

The relay unit 304 relays the video data from the distributor-side user terminal 20 to the viewer-side user terminal 30 in the live streaming started by the distribution information providing unit 302. The relay unit 304 receives from the input information transmission unit 206 a signal that represents user input by a viewer during the live streaming or reproduction of the video data. The signal that represents user input may be an object specifying signal for specifying an object displayed on the display of the user terminal 30. The object specifying signal may include the viewer ID of the viewer, the distributor ID of the distributor of the live stream that the viewer watches, and an object ID that identifies the object. When the object is a gift, the object ID is the gift ID. Similarly, the relay unit 304 receives, from the distribution unit 100 of the user terminal 20, a signal that represents user input performed by the distributor during reproduction of the video data (or during the live streaming). The signal could be an object specifying signal.

Alternatively, the signal that represents user input may be a comment input signal including a comment entered by a viewer into the user terminal 30 and the viewer ID of the viewer. Upon reception of the comment input signal, the relay unit 304 transmits the comment and the viewer ID included in the signal to the user terminal 20 of the distributor and the user terminals 30 of other viewers. In these user terminals 20 and 30, the viewer-side UI control unit 202 and the superimposed information generation unit 204 display the received comment on the display in association with the viewer ID also received.

The gift processing unit 306 updates the user DB 312 so as to increase the points of the distributor depending on the points of the gift identified by the gift ID included in the object specifying signal. Specifically, the gift processing unit 306 refers to the gift DB 314 to specify the points to be granted for the gift ID included in the received object specifying signal. The gift processing unit 306 then updates the user DB 312 to add the determined points to the points of (or corresponding to) the distributor ID included in the object specifying signal.

The payment processing unit 308 processes payment of a price of a gift from a viewer in response to reception of the object specifying signal. Specifically, the payment processing unit 308 refers to the gift DB 314 to specify the price points of the gift identified by the gift ID included in the object specifying signal. The payment processing unit 308 then updates the user DB 312 to subtract the specified price points from the points of the viewer identified by the viewer ID included in the object specifying signal.

FIG. 4 is a data structure diagram of an example of the stream DB 310 of FIG. 3. The stream DB 310 holds information regarding a live stream currently taking place. The stream DB 310 stores the stream ID, the distributor ID, and the viewer ID, in association with each other. The stream ID is for identifying a live stream on a live streaming platform provided by the live streaming system 1. The distributor ID is a user ID for identifying the distributor who provides the live stream. The viewer ID is a user ID for identifying a viewer of the live stream. In the live streaming platform provided by the live streaming system 1 of some embodiments, when a user starts a live stream, the user becomes a distributor, and when the same user views a live stream broadcast by another user, the user also becomes a viewer. Therefore, the distinction between a distributor and a viewer is not fixed, and a user ID registered as a distributor ID at one time may be registered as a viewer ID at another time.

FIG. 5 is a data structure diagram showing an example of the user DB 312 of FIG. 3. The user DB 312 holds information regarding users. The user DB 312 stores the user ID and the point, in association with each other. The user ID identifies a user. The point corresponds to the points the corresponding user holds. The point is the electronic value circulated within the live streaming platform. In some embodiments, when a distributor receives a gift from a viewer during a live stream, the distributor's points increase by the value corresponding to the gift. The points are used, for example, to determine the amount of reward (such as money) the distributor receives from the administrator of the live streaming platform. In some embodiments, when the distributor receives a gift from a viewer, the distributor may be given the amount of money corresponding to the gift instead of the points.

FIG. 6 is a data structure diagram showing an example of the gift DB 314 of FIG. 3. The gift DB 314 holds information regarding gifts available for the viewers in the live streaming. A gift is electronic data. A gift may be purchased with the points or money, or can be given for free. A gift may be given by a viewer to a distributor. Giving a gift to a distributor is also referred to as using, sending, or throwing the gift. Some gifts may be purchased and used at the same time, and some gifts may be purchased and then used at any time later by the purchaser viewer. When a viewer gives a gift to a distributor, the distributor is awarded the amount of points corresponding to the gift. When a gift is used, the use may trigger an effect associated with the gift. For example, an effect (such as visual or sound effect) corresponding to the gift will appear on the live streaming screen.

The gift DB 314 stores the gift ID, the awarded points, and the price points, in association with each other. The gift ID is for identifying a gift. The awarded points are the amount of points awarded to a distributor when the gift is given to the distributor. The price points are the amount of points to be paid for use (or purchase) of the gift. A viewer is able to give a desired gift to a distributor by paying the price points of the desired gift when the viewer is viewing the live stream. The payment of the price points may be made by an appropriate electronic payment means. For example, the payment may be made by the viewer paying the price points to the administrator. Alternatively, bank transfers or credit card payments may be used. The administrator is able to desirably set the relationship between the awarded points and the price points. For example, it may be set as the awarded points=the price points. Alternatively, points obtained by multiplying the awarded points by a predetermined coefficient such as 1.2 may be set as the price points, or points obtained by adding predetermined fee points to the awarded points may be set as the price points.

In some embodiments, the distribution information providing unit 302 provides (or recommends) contents (or streams) to viewers (or user terminals of the viewers) according to recommendation logics stored in the Recommendation logic DB 350. For example, the distribution information providing unit 302 may provide content A according to recommendation logic A to a viewer. The distribution information providing unit 302 may provide content B according to recommendation logic B to the viewer. Content A and content B may be provided to the viewer and may be displayed at the user terminal of the viewer at the same time.

The detecting unit 330 is configured to obtain interaction data from the viewers (or user terminals of the viewers). The interaction data may include interaction actions of the viewers with respect to the contents recommended to them. For example, the interaction data may include click rates or (average) retention lengths of the viewers with respect to contents recommended to them according to different recommendation logics.

In some embodiments, a click rate of a viewer with respect to a recommendation logic could be defined as [number of streams recommended by the recommendation logic and clicked by the viewer] divided by [number of total streams recommended by the recommendation logic to the viewer] (in a predetermined time period, for example).

In some embodiments, an average retention length of a viewer with respect to a recommendation logic could be defined as [average time length spent by the viewer on a stream recommended by the recommendation logic] (in a predetermined time period, for example). For example, a viewer spent 1 min on stream A1 recommended by logic A, 2 mins on stream A2 recommended by logic A, 5 mins on stream B1 recommended by logic B. and 7 mins on stream B2 recommended by logic B. The average retention length of the viewer with respect to logic A would be 1.5 mins. The average retention length of the viewer with respect to logic B would be 6 mins.

In some embodiments, the interaction data (or interaction actions) may include view duration, gifting times, gifting amounts, comment amounts and/or following actions of the viewers with respect to the contents recommended to them.

The recommending unit 332 is configured to determine or adjust the contents (or streams) to be recommended to a viewer. For example, the recommending unit 332 may adjust the allocation of contents recommended by respective recommendation logics to be shown in the user terminal of the viewer. The recommending unit 332 may adjust the allocation of contents according to the interaction data.

For example, according to the interaction data, the recommending unit 332 determines that the viewer has interacted more with contents recommended by logic A (for example, higher click rates, longer retention lengths, more gifting times, greater gifting amounts, more comment amounts and/or more following actions). The recommending unit 332 then adjusts the allocation of contents to display more contents recommended from logic A to the viewer. In some embodiments, the recommending unit 332 may adjust the allocation of contents to display contents recommended by logic A in a higher order (or with a higher priority), compared with contents recommended by other logics.

In some embodiments, the recommending unit 332 may calculate scores of streams for viewers according to different recommendation logics and the interaction data, and make the recommendation according to the scores. The scores may be stored in the score DB 354.

FIG. 7 is a data structure diagram showing an example of the recommendation logic DB 350 of FIG. 3. The recommendation logic DB 350 stores the logic ID and the recommendation logic (or recommendation algorithm), in association with each other.

In some embodiments, the similarity matching logic utilizes user attributes and stream attributes to calculate a similarity score for each viewer-stream pair. The similarity matching logic then recommends contents to viewers based on their similarity scores with the streams. In some embodiments, the collaborative filtering logic recommends contents that a viewer might like on the basis of reactions by similar viewers. In some embodiments, the thumbnail recommendation recommends streams according to popularity (for example, click rates) of thumbnails of the streams. In some embodiments, the popularity-based filtering logic recommends streams based on their popularity, such as the number of views, likes, giftings, or shares. It assumes that popular streams are more likely to be of interest to all viewers. In some embodiments, the demographic-based filtering logic recommends streams based on the viewer's demographic information, such as age, gender, and location. It assumes that viewers with similar demographics are likely to have similar preferences and interests.

FIG. 8 shows exemplary data in the interaction DB 352 of FIG. 3. The interaction DB 352 stores the click rates, the viewer ID, and the contents recommended by different logics, in association with each other.

As shown in FIG. 8, the click rate of viewer V1 with respect to contents recommended by logic RL2 is 0.4. The click rate of viewer V2 with respect to contents recommended by logic RL1 is 0.6. The click rate of viewer V3 with respect to contents recommended by logic RL3 is 0.7. In some embodiments, a click rate of 0.7 could mean a 70% percentage. In this embodiment, it may be determined that viewer V1 has more preference for (or interacted more with) contents recommended by logic RL2. It may be determined that viewer V2 has more preference for (or interacted more with) contents recommended by logic RL1. It may be determined that viewer V3 has more preference for (or interacted more with) contents recommended by logic RL3.

FIG. 9 shows exemplary data in the interaction DB 352 of FIG. 3. The interaction DB 352 stores the average retention lengths, the viewer ID, and the contents recommended by different logics, in association with each other.

As shown in FIG. 9, the average retention length of viewer V1 with respect to contents recommended by logic RL2 is 5 mins. The average retention length of viewer V2 with respect to contents recommended by logic RL1 is 7 mins. The average retention length of viewer V3 with respect to contents recommended by logic RL1 is 6 mins. In this embodiment, it may be determined that viewer V1 has more preference for (or interacted more with) contents recommended by logic RL2. It may be determined that viewer V2 has more preference for (or interacted more with) contents recommended by logic RL1. It may be determined that viewer V3 has more preference for (or interacted more with) contents recommended by logic RL1.

Figure 10:
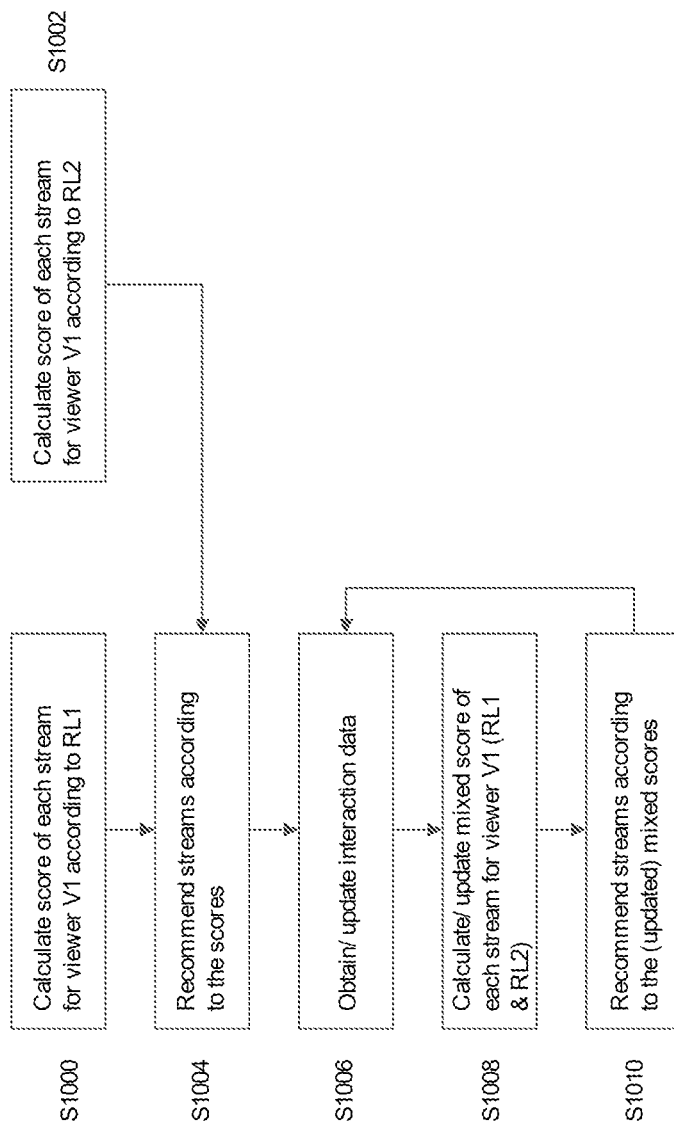
FIG. 10 shows an exemplary flow chart illustrating a method according to some embodiments of the present disclosure.

FIG. 10 shows an exemplary flow chart illustrating a method according to some embodiments of the present disclosure.

At step S1000, the recommending unit 332 determines or calculates a recommendation score of each available stream for viewer V1 according to recommendation logic RL1.

At step S1002, the recommending unit 332 determines or calculates a recommendation score of each available stream for viewer V1 according to recommendation logic RL2.

In some embodiments, a recommendation score is determined, by the corresponding recommendation logic, according to content attribute data of the corresponding stream and viewer attribute data of the viewer. The content attribute data may include tags or labels of the stream. The content attribute data may be detected or determined in a real time manner. The viewer attribute data may include gender, nationality, location of the viewer or preferences provided by the viewer, for example. For example, the similarity matching logic may determine the recommendation score to be (or according to) a similarity score (or matching score) between the content attribute data and the viewer attribute data. In some embodiments, the recommendation scores are determined in a real time manner.

In some embodiments, a recommendation score may be determined, by the corresponding recommendation logic, according to content attribute data of the corresponding stream. For example, in some embodiments, a popularity-based filtering logic may determine the recommendation score to be (or according to) a popularity score. The popularity score may be determined by how popular the stream is. For example, more comments, more giftings and/or more following actions could lead to a higher popularity score of the stream.

In some embodiments, a collaborative filtering logic may determine the recommendation score of a stream for a viewer V1 according to the number of similar viewers (viewers similar to viewer V1) who also like the stream. For example, if more similar viewers liked (or interacted with) a stream, the score may be set higher for the viewer with respect to the stream.

At step S1004, the recommending unit 332 recommends streams to viewer V1 according to the scores calculated in steps S1000 and S1002. In some embodiments, the distribution information providing unit 302 may be involved in the recommendation process. In some embodiments, the number of streams recommended to the viewer from respective logics could be the same. For example, N streams with higher scores according to RL1 and N streams with higher scores according to RL2 can be presented to viewer V1. In some embodiments, the allocation of streams recommended to the viewer from respective logics could be in an even or a fair manner. In some embodiments, only streams with scores higher than a threshold or streams with first N higher scores are presented to viewer V1.

At step S1006, the detecting unit 330 obtains (or updates) interaction data with respect to the recommended streams from the user terminal of viewer V1. The interaction data may be stored into the interaction DB 352.

At step S1008, the recommending unit 332 calculates (or updates) a mixed score of each stream for viewer V1 according to the interaction data. The recommending unit 332 calculates a mixed score of each stream for viewer V1 according to logic RL1. The recommending unit 332 calculates a mixed score of each stream for viewer V1 according to logic RL2. In some embodiments, the mixed scores could be viewed as updated versions of the recommendation scores calculated in steps S1000 and S1002. The recommending unit 332 may calculate weight data from the interaction data, and utilize the weigh data to update the recommendation scores.

At step S1010, the recommending unit 332 recommends streams to viewer V1 according to the mixed scores calculated in step S1008. The recommending unit 332 may adjust the streams recommended to viewer V1. The recommending unit 332 may adjust the allocation of streams from logic RL1 and logic RL2 according to the mixed scores. Streams with higher mixed scores may be presented first or with higher priorities.

After step S1010, the flow goes back to step S1006. The processes S1006, S1008 and S1010 may be executed periodically. The interaction data is updated, the mixed scores are updated according to the updated interaction data, and the allocation of streams to be recommended to the viewer is updated according to the updated mixed scores.

Figure 11:
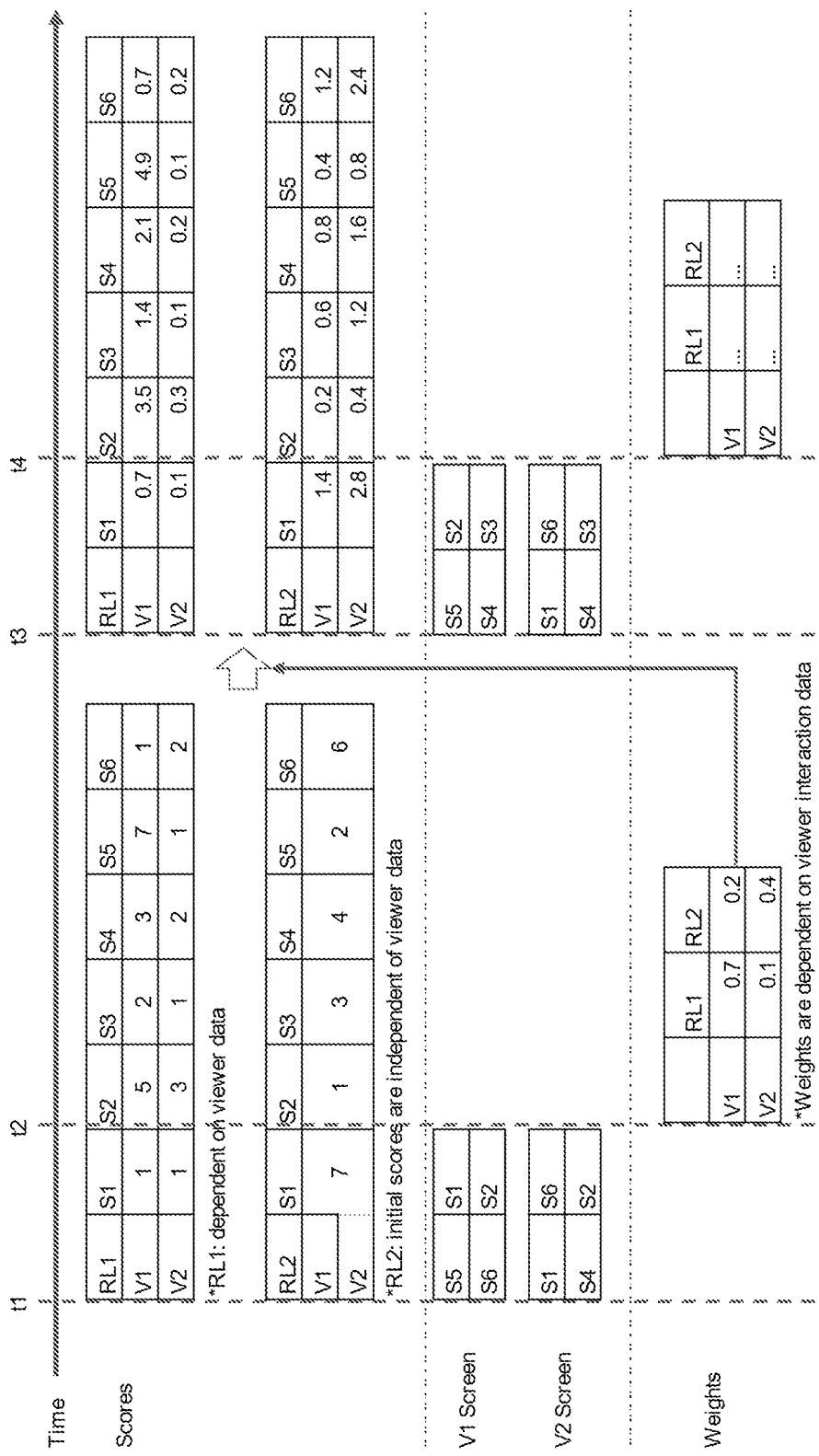
FIG. 11 shows an example of recommendation according to some embodiments of the present disclosure.

FIG. 11 shows an example of recommendation according to some embodiments of the present disclosure.

At timing t1, scores (or initial recommendation scores) of streams (S1, S2, S3, S4, S5 and S6) are calculated for viewers V1 and V2, according to recommendation logics RL1 and RL2. With RL1, the scores are dependent on viewer data, so the scores are different for different viewers. With RL2, the scores are independent of viewer data, so the scores are the same for different viewers. For example, RL1 could be a similarity matching logic, and RL2 could be a popularity-based filtering logic.

At timing t1 (or during time t1 to timing t3), the streams S5, S1, S6 and S2 are displayed on (or recommended to) viewer V1's screen because they have higher scores (according to RL1 or RL2) with respect to viewer V1. The display order is according to their scores.

At timing t1 (or during timing t1 to timing t3), the streams S1, S6, S4 and S2 are displayed on (or recommended to) viewer V2's screen because they have higher scores (according to logic RL1 or logic RL2) with respect to viewer V2. The display order is according to their scores. In this embodiment, the score of stream S2 calculated according to logic RL1 is the same as the score of stream S3 calculated according to logic RL2 (both are 3). The stream S2 is selected due to logic balance in this embodiment.

At timing t2, weights (for each viewer-logic pair) are calculated according to interaction data of viewers V1 and V2 with respect to the streams recommended to them. The interaction data may include the click rates and/or the retention lengths. As shown in FIG. 11, at timing t2, the weight data shows that viewer V1 interacted more with streams (S5 and S2) selected according to logic RL1, and that viewer V2 interacted more with streams (S1 and S6) selected according to logic RL2.

In some embodiments, a weight for a viewer-logic pair could be greater when the viewer performed higher click rates and/or longer retention lengths with respect to streams selected according to the logic. In some embodiments, a weight for a viewer-logic pair could be proportional to the click rates, retention lengths and/or other interaction actions performed by the viewer with respect to streams selected according to the logic. The weight could be determined or calculated by the recommending unit 332.

At timing t3, scores (or mixed scores/updated recommendation scores) of streams (S1, S2, S3, S4, S5 and S6) for respective viewers with respect to respective logics are calculated, according to the initial recommendation scores and the weight data calculated at timing t2. For example, for the V1-S1 pair, under logic RL1, the mixed score 0.7 of stream S1 for viewer V1 is calculated according to the initial recommendation score 1 and the weight 0.7. For example, for the V2-S1 pair, under logic RL2, the mixed score 2.8 of stream S1 for viewer V2 is calculated according to the initial recommendation score 7 and the weight 0.7.

At timing t3 (or right after timing t3), the streams S5, S2, S4 and S3 are displayed on (or recommended to) viewer V1's screen because they have higher mixed scores (according to RL1 or RL2) with respect to viewer V1. The display order is according to their mixed scores. In this embodiment, the mixed score of stream S3 calculated according to logic RL1 is the same as the mixed score of stream S1 calculated according to logic RL2 (both are 1.4). The stream S3 is selected because logic RL1 has higher weight for viewer V1.

At timing t3 (or right after timing t3), the streams S1, S6, S4 and S3 are displayed on (or recommended to) viewer V2's screen because they have higher mixed scores (according to logic RL1 or logic RL2) with respect to viewer V2. The display order is according to their mixed scores.

At timing t4, weights (for each viewer-logic pair) are calculated (or updated) according to newly received interaction data of viewers V1 and V2 with respect to the streams recommended to them. The interaction data could include the click rates and/or the retention lengths. The weight data is updated in a real time manner with selection results from the viewers, and the weight data is specific to each viewer.

In some embodiments, there could be a minimum weight determined for new recommendation logics. That can make sure the contents recommended by the new logics will be displayed for a time period and the corresponding interaction data can be collected for subsequent allocation adjustments.

In some embodiments, the score data or the weight data could be calculated and stored into the score DB 354 by the recommending unit 332. In some embodiments, timing t2 and timing t3 could be substantially the same.

In some embodiments, the refresh (or update) of the streams displayed to a viewer (or the weight data, or the mixed scores) may be performed once whenever the viewer interacts with (or views) a predetermined number of streams. The length between timing t1 and timing t3 may not be fixed.

The present disclosure recommends contents in a customized manner for different users. The present disclosure recommends contents to different viewers according to different recommendation logics, by utilizing different viewers' interaction data. Each viewer can have his/her optimal recommendation logic/version. The present disclosure automatically finds the optimal recommendation logic/version for each user according to the user's behavior history. The recommendation slots are "customized" as the viewer continues to use the streaming application.

In some embodiments, machine learning may be utilized in determining the preferences of the viewers with respect to different recommendation logics. For example, ensemble learning may be implemented. The interaction data may be input into the machine learning model to deliver (or predict) the preference data for each viewer.

In some embodiments, to a viewer, only streams with scores (recommendation scores or mixed scores) higher than thresholds of respective recommendation logics could be recommended.

In some embodiments, interaction data obtained after a viewer enters a stream may have bigger impacts on determining the weight data than interaction data obtained before a viewer enters a stream. For example, referring to FIG. 8 and FIG. 9. The click rate data shows that viewer V3 has more preference on contents recommended by logic RL3. The retention length data shows that viewer V3 has more preference on contents recommended by logic RL1. Because the retention length data is taken after the viewer enters and views the actual contents, it has more impact on determining the weight data. In the embodiment of FIG. 8, the higher click rate indicates that viewer V3 is more attracted to the thumbnails of the streams recommended by the thumbnail recommendation logic. But from the retention length data in FIG. 9, we know viewer V3 actually prefers streams recommended by the similarity matching logic.

In some embodiments, before determining preferences (or weight data) of a viewer with respect to different recommendation logics, streams with higher scores according to one logic and lower scores according to another logic may be chosen to be displayed to the viewer. For example, a first group of streams and a second group of streams are displayed to a viewer. The first group of streams have scores higher than a first threshold according to a first logic and scores lower than a second threshold according to a second logic, for the viewer. Therefore, the first group of streams can be good representatives of the first logic. The second group of streams have scores lower than a third threshold according to the first logic and scores higher than a fourth threshold according to the second logic, for the viewer. Therefore, the second group of streams can be good representatives of the second logic. The arrangement makes the subsequently obtained interaction data more reliable in determining the viewer's preferences with respect to different recommendation logics. The arrangement may reduce confusions or misjudgements in determining the preferred recommendation logic of the viewer.

For example, in FIG. 11, at timing t1, streams S5, S1, S6 and S2 are displayed to viewer V1. Stream S5 has a high score (7) according to logic RL1 and a low score (2) according to logic RL2. Stream S2 has a high score (5) according to logic RL1 and a low score (1) according to logic RL2. Stream S1 has a low score (1) according to logic RL1 and a high score (7) according to logic RL2. Stream S6 has a low score (1) according to logic RL1 and a high score (6) according to logic RL2. Therefore, if viewer V1 interacts more with streams S5 and/or S2, it is clear that viewer V1 prefers contents recommended by logic RL1. If viewer V1 interacts more with streams S1 and/or S6, it is clear that viewer V1 prefers contents recommended by logic RL2.

In some embodiments, VIP exploring viewers may be identified. The streams recommended by different recommendation logics are recommended to the VIP exploring viewers. The weight data are calculated according to their interaction data, and then used for subsequent recommendations. A VIP exploring viewer may be defined by one or more of the following viewer attribute data (or interaction behavior): not being loyal to a specific distributor but interacting with (gifting, commenting, following, for example) many distributors, or keeping exploring new distributors. Their preferences may not develop or fix yet, and the present disclosure may help recommend contents to them according to their desired recommendation logics.

Figure 12:
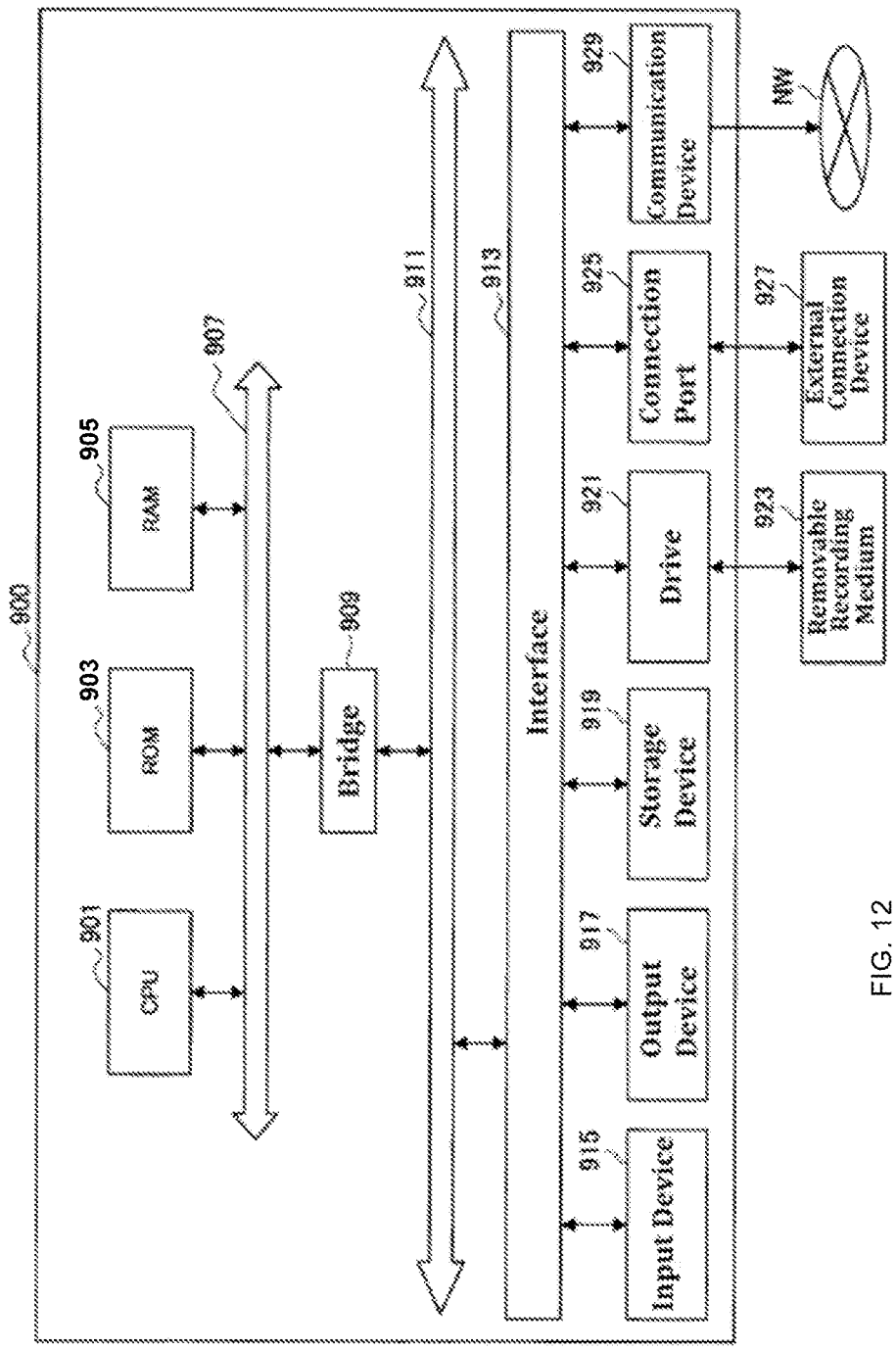
FIG. 12 is a block diagram showing an example of a hardware configuration of the information processing device according to some embodiments of the present disclosure.

Referring to FIG. 12, the hardware configuration of the information processing device will be now described. FIG. 12 is a block diagram showing an example of a hardware configuration of the information processing device according to some embodiments of the present disclosure. The illustrated information processing device 900 may, for example, realize the server 10 and/or the user terminals 20 and 30 in some embodiments.

The information processing device 900 includes a CPU 901, ROM (Read Only Memory) 903, and RAM (Random Access Memory) 905. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 903, the RAM 905, the storage device 919, or the removable recording medium 923. For example, the CPU 901 controls the overall operation of each functional unit included in the server 10 and the user terminals 20 and 30 in some embodiments. The ROM 903 stores programs, calculation parameters, and the like used by the CPU 901. The RAM 905 serves as a primary storage that stores a program used in the execution of the CPU 901, parameters that appropriately change in the execution, and the like. The CPU 901, ROM 903, and RAM 905 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OLED, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 905. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

The configuration and operation of the live streaming system 1 in the embodiment have been described. This embodiment is a mere example, and it is understood by those skilled in the art that various modifications are possible for each component and a combination of each process, and that such modifications are also within the scope of the present disclosure.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed, but includes another variation and modification that do not disobey the present disclosure, and is the scope covered by the patent application scope.

Figure 13:
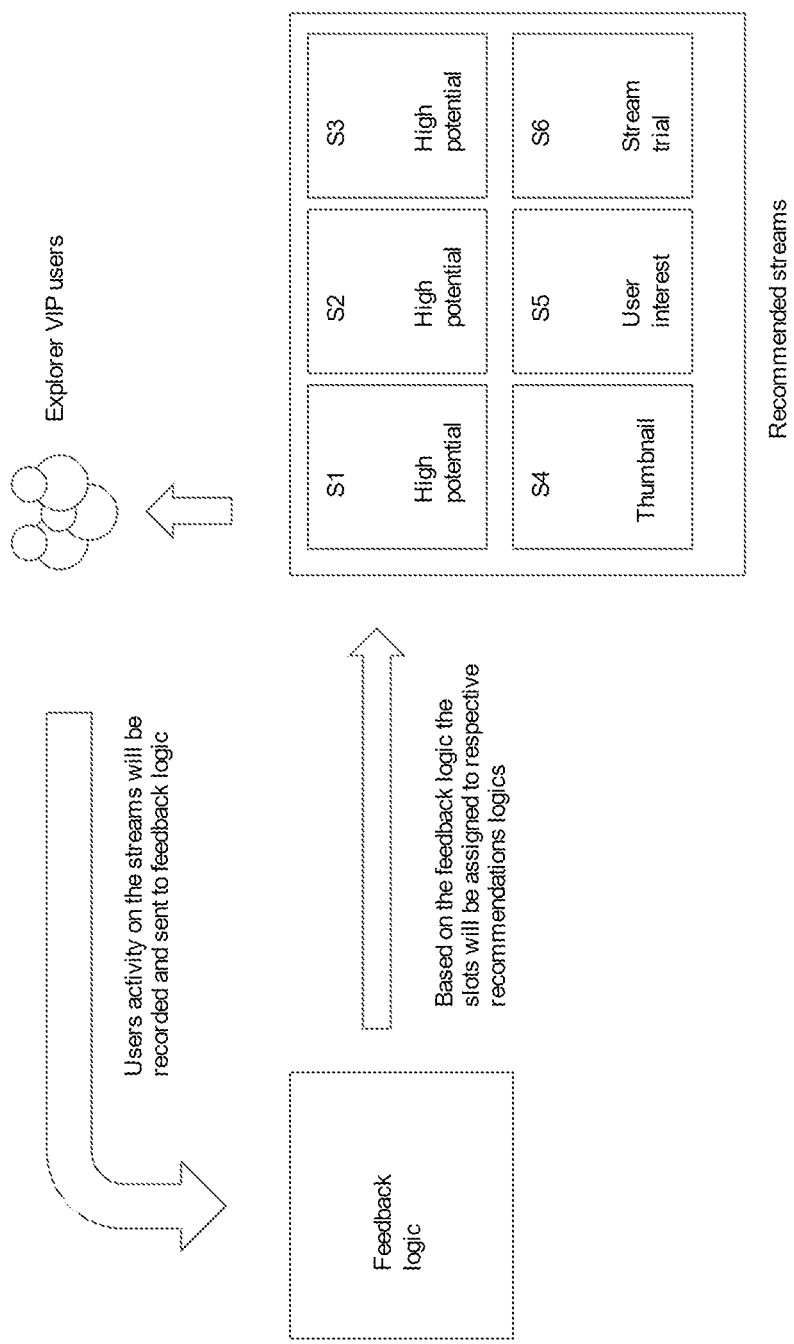
FIG. 13 shows a schematic view of the recommendation system according to some embodiments of the present disclosure.

FIG. 13 shows a schematic view of the recommendation system according to some embodiments of the present disclosure. The system recommends six live streams S1, S2, S3, S4, S5 and S6 to the explorer VIP users. The explorer VIP user is a user who proactively seeks for new streamers (or distributors) to support and whose spending is over a threshold amount. The system may determine the explorer VIP by monitoring and analyzing the behavioral data of users. The six recommended live streams are from different types of machine-learning recommendation models. The three recommended live streams S1, S2 and S3 are from a machine-learning recommendation model for selecting high potential streamers. The recommended live stream S4 is from a machine-learning recommendation model for selecting streams having good thumbnails. The recommended live stream S5 is from a machine-learning recommendation model for selecting streams with high user interests. The recommended live stream S6 is from a machine-learning recommendation model for selecting new streamers.

The user activities (or interaction data) on the recommended live streams are recorded at the system. The system has a feedback logic unit configured to receive the recorded user activities. The feedback logic unit is configured to control assignment of the slots on the recommendation page to the machine-learning recommendation models based on a feedback logic. The feedback logic is arranged so that, the more the results of a machine-learning recommendation model are preferred (or interacted with) by a user, the more the slots on the recommendation page for the user are assigned to the machine-learning recommendation model.

An example of the feedback logic will be explained hereinunder. It is assumed that there are two machine-learning recommendation models RS1 and RS2. The user activities for user A indicated that user A watched three live streams recommended by RS1 and that, out of the three, the user liked 2 live streams and the user A did not dislike any. The user activities for user A indicated that user A watched two live streams recommended by RS2 and that, out of the two, the user liked 1 live stream and disliked 1 live stream. FIG. 14 is a table indicating the number of live streams explored by user A.

The feedback logic unit receives the data indicated in FIG. 14. The feedback logic unit calculates "likeability" of each of RS1 and RS2. The feedback logic unit calculates watched rate, liked rate and non-disliked rate for each of RS1 and RS2. The feedback logic unit calculates an average rate among the three calculated rates for each of RS1 and RS2.

The watched rate for RS1 is equal to the number of live streams recommended by RS1 divided by the total number of live streams. In this case, it is 3/5=0.6 (60%). The liked rate for RS1 is equal to the number of liked live streams recommended by RS1 divided by the total number of liked live streams. In this case, it is 2/3=0.6667 (66.67%). The non-disliked rate for RS1 is equal to 1–(the number of disliked live streams recommended by RS1 divided by the total number of disliked live streams). In this case, it is 1–(0/1)=1 (100%). The rates for RS2 are calculated in a similar manner. FIG. 15 is a table indicating the calculated rates for each of RS1 and RS2.

The feedback logic unit is configured to assign slots to each of RS1 and RS2 according to the calculated average rates. In the example of FIG. 15, there are six slots in total. Five slots out of the six slots are assigned to RS1 and one slot is assigned to RS2. The feedback logic unit determines that the allocation to RS2 is 1 by calculating 24.44%/100%× 6~1.46 . . . ~1. The feedback logic unit determines that the allocation to RS1 is 5 by calculating 75.56%/100%×6~ 4.53 . . . ~5.

Figure 16:
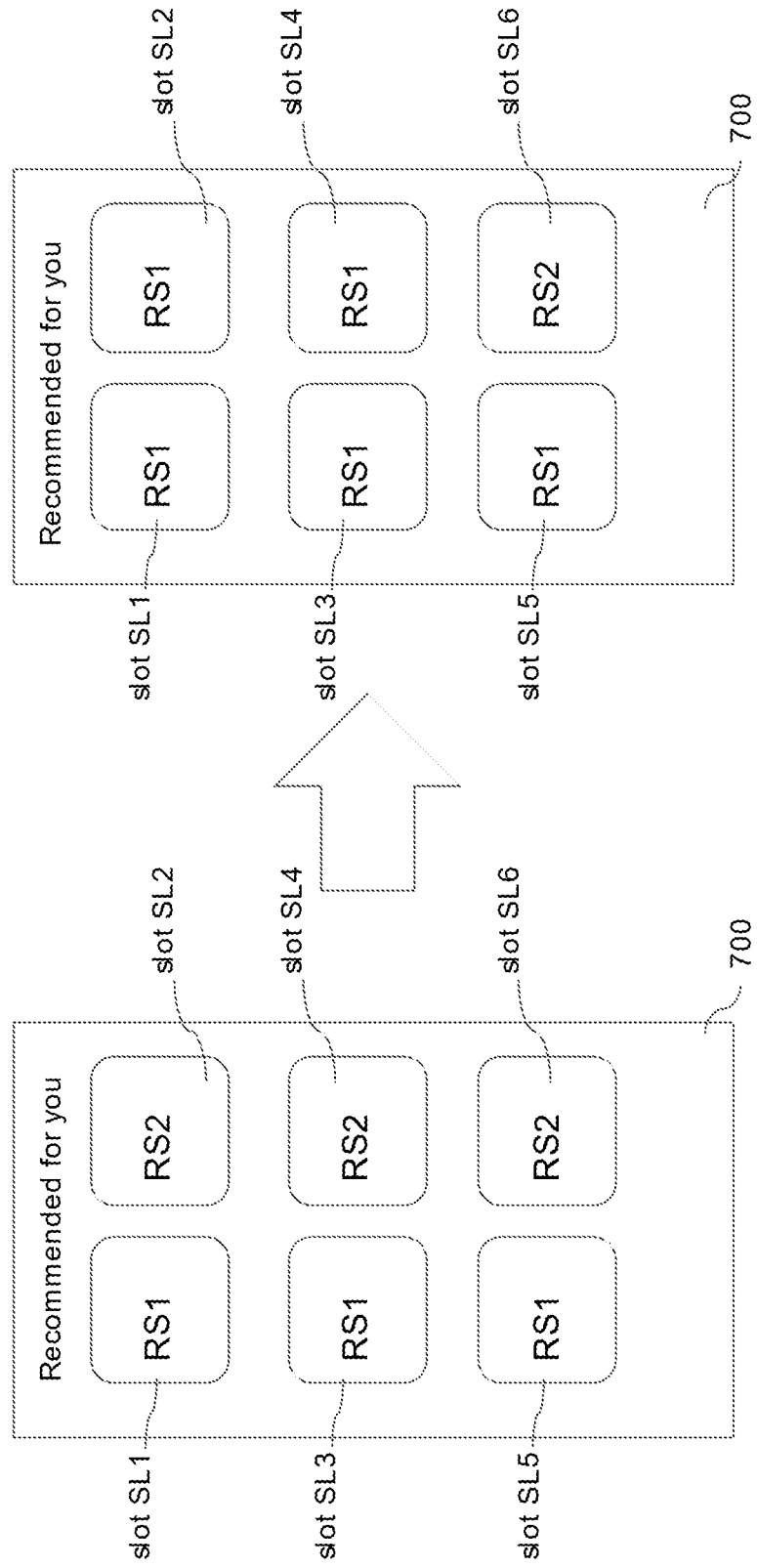
FIG. 16 is a schematic view explaining the change of slots on the recommendation page displayed on a display of a user terminal of a user.

FIG. 16 is a schematic view explaining the change of slots on the recommendation page displayed on a display of a user terminal of a user. The recommendation page 700 has six slots (slot SL1 to slot SL6) for thumbnails of currently-available live streams. The upper the position of the slot is on the page 700, the more attention a thumbnail shown on the slot draws from the user. Therefore, the probability of such thumbnail being clicked is higher. For example, the slot SL1 is better than the slot SL3 in terms of viewed opportunity. At first, three thumbnails representing the top three recommended live streams resulting from RS1 for the user are positioned in the slots SL1, SL3 and SL5. Three thumbnails representing the top three recommended live streams resulting from RS2 for the user are positioned in the slots SL2, SL4 and SL6. This assumes that there is no difference in likeability between RS1 and RS2. Therefore, the slots are assigned so that the viewed opportunities of RS1 and RS2 are equivalent. Now, the user selects a thumbnail positioned at the slot SL1. The user activity (such as interaction data) indicating that the thumbnail at the slot SL1 (representing a live stream recommended by RS1) is sent to the system.

The system's feedback logic unit proceeds with the calculations explained above. Then the feedback logic unit determines that five slots should be assigned to RS1 and one slot is assigned to RS2. The feedback logic unit sends the instructions to the user terminal of the user. The user terminal, in response to receiving the instructions, performs reallocation of slots on the recommendation page 700. As determined by the feedback logic unit, five slots (SL1 to SL5) are assigned to RS1 and one slot (SL6) is assigned to RS2. Five thumbnails representing the top five recommended live streams resulting from RS1 for the user are positioned in the slots SL1 to SL5. One thumbnail representing the top recommended live stream resulting from RS2 for the user is positioned in the slot SL6. By having such a mechanism, each user will have his/her optimal recommendation page. The system automatically finds the optimal slot arrangement for each user by reviewing the selection history. The slots are "customized" as the user continues to use the live streaming application.

According to the above embodiment, the recommendation page becomes more consistent with the preference of the user, which increases the user satisfaction. Different users might find different versions of the recommendation system or a combination of multiple versions more relevant to their preferences. The embodiment can cope with this situation by gradually increasing the proportion of the live streams which are liked by the user.

In some embodiments, instead of changing the number of slots allocated to the recommendation model, the position of slots allocated to the recommendation model may be changed. For example, referring to FIG. 16, after the user selects a thumbnail positioned at the slot SL1, slots SL1-SL3 may be assigned to RS1 for better viewed opportunity and the remaining slots SL4-SL6 may be assigned to RS2.

In some embodiments, a lower limit number of slot(s) may be set for each of the recommendation models. If the lower limit number is set to be 1, then even if the average rate of a certain recommendation model is close to zero, there still is at least one slot assigned to the certain recommendation model. This ensures that there is enough variability for the users to explore.

The above-disclosed embodiments also are described as follows:

A server, comprising:
        a first allocation unit configured to allocate different recommendation logics to different positions on a page which is shown on a user terminal requesting stream information, the allocation being based on information on the user;
        a second allocation unit configured to allocate a stream to a position via the recommendation logic which is allocated to the position by the first allocation unit, the stream being outputted from the recommendation logic as a recommended stream; and a communication unit configured to send, via a network and to the requesting user terminal, the results of allocation at the second allocation unit.

Figure 17:
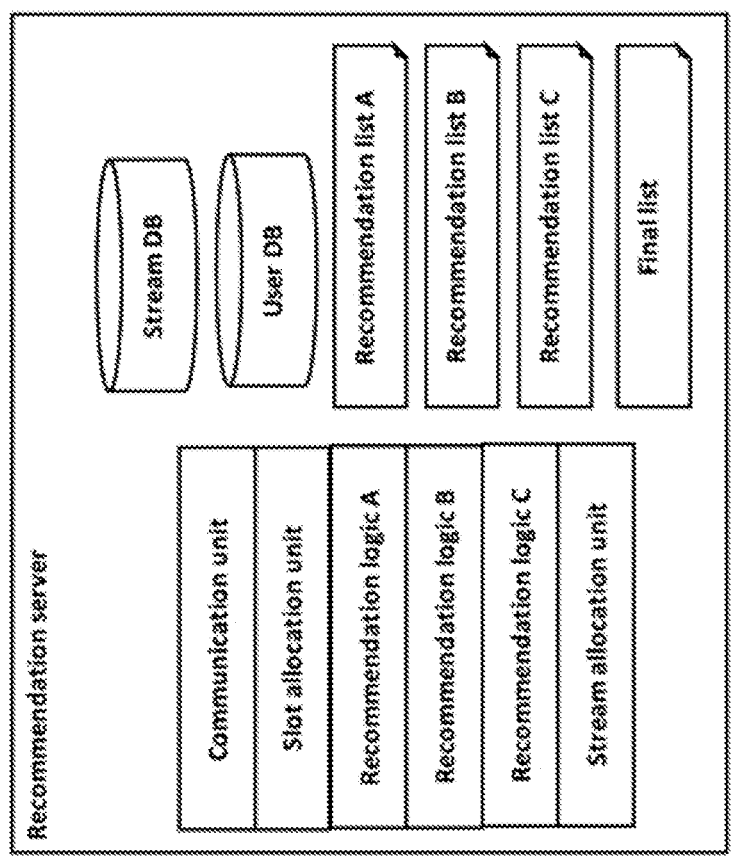
FIG. 17 is a block diagram of a recommendation server according to some embodiments of the present disclosure.

FIG. 17 is a block diagram of a recommendation server according to some embodiments of the present disclosure. The server comprises a communication unit, a slot allocation unit, a recommendation logic A, a recommendation logic B, a recommendation logic C, a stream allocation unit, a steam DB, a user DB, a recommendation list A, a recommendation list B, a recommendation list C and a final list.

The communication unit is configured to communicate, via a network, with a user terminal of a user. The stream DB stores information on live streams on-going in the live streaming platform. The user DB stores information on the users registered to the live streaming platform.

A recommendation logic is an algorithm which outputs a respective recommendation list in which live streams with their matching scores are listed. The logic can be rule-based or machine-learning based. In this example, there are three different recommendation logics; however, the present disclosure is not limited to this, and any number of and any type of recommendation logic may be used.

Figure 18:
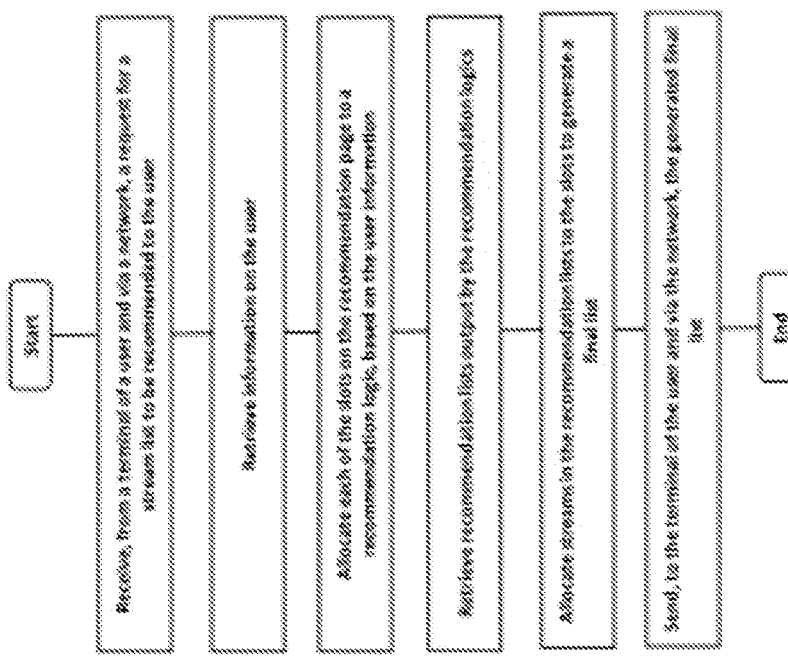
FIG. 18 shows an exemplary flow chart illustrating a method according to some embodiments of the present disclosure.

FIG. 18 shows an exemplary flow chart illustrating a method according to some embodiments of the present disclosure. The communication unit receives, from a terminal of a user and via a network, a request for a stream list to be recommended to the user. The slot allocation unit, in response to receiving the request, retrieves information on the requesting user. The slot allocation unit allocates each of the slots or positions on the recommendation page to a recommendation logic, based on the user information. This slot allocation may be rule-based or machine-learning based.

The steam allocation unit retrieves recommendation lists output by the recommendation logics. The stream allocation unit allocates streams in the recommendation lists to the slots to generate a final list. The communication unit sends, to the requesting user terminal and via the network, the generated final list.

Figure 19:
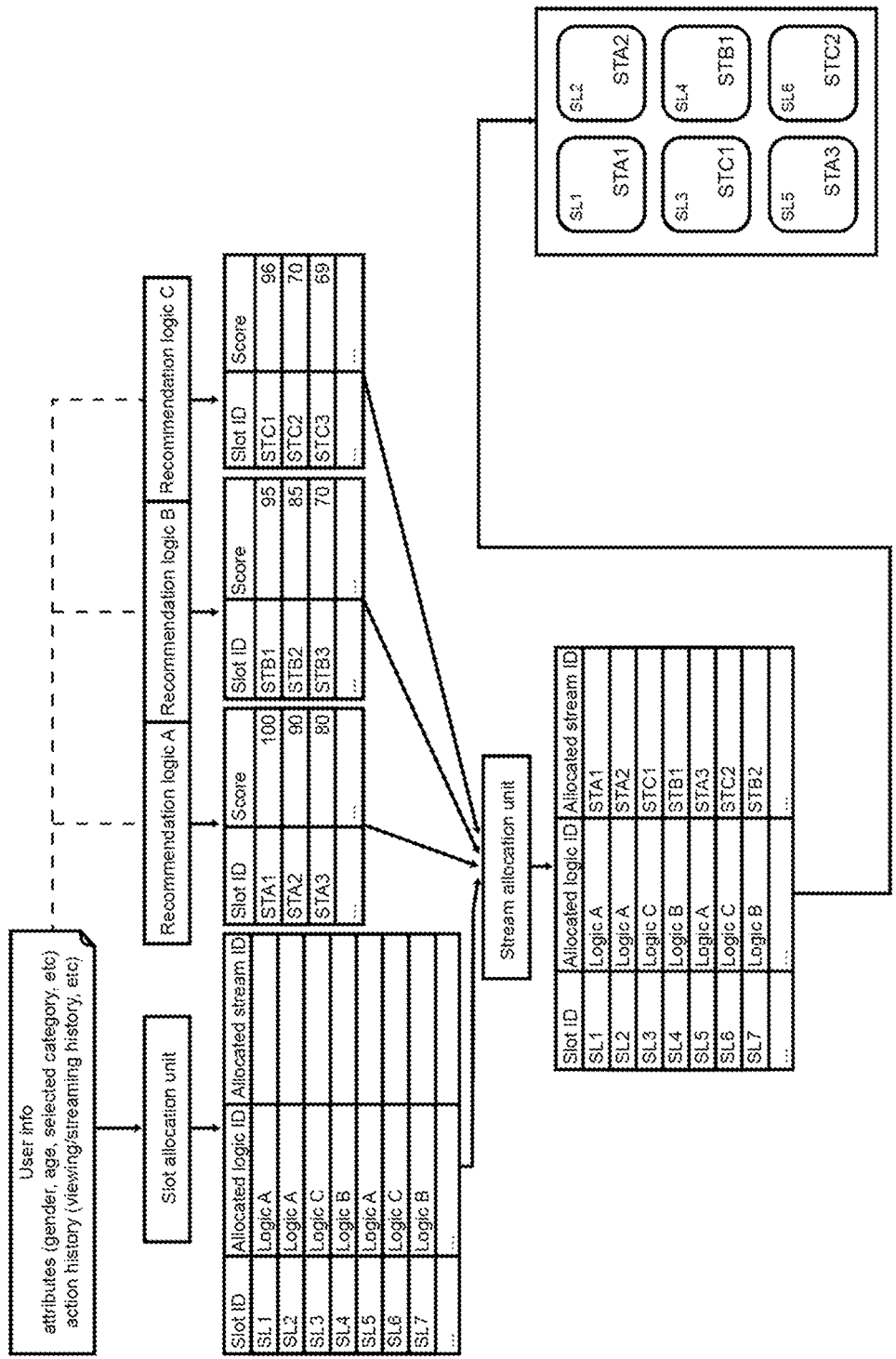
FIG. 19 is a schematic diagram showing an exemplary process and data according to some embodiments of the present disclosure.

FIG. 19 is a schematic diagram showing an exemplary process and data according to some embodiments of the present disclosure. The communication unit receives the request for recommended streams. The slot allocation unit, in response to receiving the request, retrieves the information on the requesting user. The information may include attributes of the requesting user (gender, age, selected category, etc) and action history of the requesting user (viewing history, streaming history, page view history, etc). The slot allocation unit uses the information on the requesting user to generate slot-to-logic allocation. For example, the slot allocation unit may classify the requesting user into one of the following three categories:

Old users: Users registered before XX days or more
Mid users: Users registered before YY days and within XX days
New users: Users registered in the last YY days.

Then the slot allocation unit may generate the slot-to-logic allocation corresponding to a respective user category. In this example, there are three allocations each corresponding to a respective category (Old, Mid and New).

Each recommendation logic A, B or C outputs its recommendation list A, B or C. The logic may use the information on the requesting user to generate the list. One example is a logic where a matching score between the requesting user and each stream is calculated based on the attributes of the requesting user and contents tag of the stream. The logic may not use the information on the requesting user. One example is:

Recommendation logic A: Streams of the streamers with levels lower than AA are extracted, then the streams are sorted by achievement scores of the streams.
Recommendation logic B: Streams of the streamers with levels lower than BB and equal to or higher than AA are extracted, then the streams are sorted by achievement scores of the streams.
Recommendation logic C: Streams of the streamers with levels equal to or higher than BB are extracted, then the streams are sorted by achievement scores of the streams.

The stream allocation unit refers to the generated slot-to-logic allocation and the three recommendation lists. The stream allocation unit allocates the stream to the slot in the order listed in the recommendation list of the recommendation logic corresponding to the slot, to generate the final list. The communication unit sends the final list to the requesting user terminal via the network. The requesting user terminal, in response to receiving the final list, generates the recommendation page according to the final list. Each slot on the recommendation page shows a thumbnail of the respective stream specified in the final list. The slot allocation unit may be updated based on the results of selection on the recommendation page, as is described in relation to FIGS. 13, 14, 15 and 16.

In the configuration described above, the slot-to-logic allocation or mapping is determined first, then a stream is allocated to each slot via a respective logic. This is in comparison with the situation where the most suitable logic is selected for the requesting user and only the results of the selected logic are used to construct the recommendation page. In such a situation, the user can only see one aspect of the recommendation and there is little variety. In the configuration described above, different logics are allocated to the slots. Therefore, the user can see results from different types of recommendations on the recommendation page. Also, the streamer will have a better chance of exposure to potential viewers because the different logics will generate different recommendation results. Therefore, diversifying exposure across all good streamers and maintaining achievement score sorting are realized.

Variations to the Example Described With FIGS. 13, 14, 15 and 16

The RS1 may be a logic where streams of a category preferred by a user are extracted, then the extracted streams are sorted by follower conversion. The follower conversion is the number of users who performed the follow action in the stream divided by the number of users who joined the stream. The follower conversion does not require prior knowledge about the user. Therefore, sorting by the follower conversion is well suited for presenting initial streams to new viewers. Preferred category is a stream category which is recorded as user preference statically or dynamically.

The RS2 may be a logic where streams of streamers a user follows are extracted, then the extracted streams are sorted by scores.

Variations to FIG. 11 or FIG. 16

The initial recommendation of streams may come from the viewing history of "advocate" users. The advocate users are the users who have long-term experiences in the live streaming platform. Specifically, providing a new user with the initial recommendation of streams resulting from the viewing histories of the advocate users is effective in increasing the probability of the new user engaging with the live streaming platform.

LIST OF REFERENCE NUMBERS 1 communication system
10 server 20 user terminal
30, 30a, 30b user terminal
LV distributor
AU1, AU2 viewer
VD, VD1, VD2 video image
NW network
30 user terminal
100 distribution unit
102 image capturing control unit
104 audio control unit
106 video transmission unit
108 distributor-side UI control unit
200 viewing unit
202 viewer-side UI control unit
204 superimposed information generation unit
206 input information transmission unit
302 distribution information providing unit
304 relay unit
306 gift processing unit
308 payment processing unit
310 stream DB
312 user DB
314 gift DB
330 detecting unit
332 recommending unit
350 recommendation logic DB
352 interaction DB
354 score DB
S1000, S1002, S1004, S1006, S1008, S1010 step
900 information processing device
901 CPU
903 ROM
905 RAM
907 host bus
909 bridge
911 external bus
913 interface
915 input device
917 output device
919 storage device
921 drive
923 removable recording medium
925 connection port
927 external connection device
929 communication device
SL1, SL2, SL3, SL4, SL5, SL6 slot
700 recommendation page
RS recommendation system

What is claimed is:

1. A method for recommendation, executed by a server, comprising:
providing a first content according to a first recommendation logic to a user terminal of a viewer;
providing a second content according to a second recommendation logic to the user terminal, wherein the second recommendation logic is different from the first recommendation logic, and the first content and the second content are displayed at the user terminal of the viewer at the same time;
obtaining interaction data from the user terminal;
calculating respectively a click rate and an average time length with respect to the first recommendation logic and the second recommendation logic based on the interaction data; and
adjusting an allocation of contents from the first recommendation logic and the second recommendation logic to be shown on the user terminal according to the interaction data, wherein adjusting the allocation of contents comprises displaying more contents recommended from the first recommendation logic or displaying contents recommended from the first recommendation logic in a higher order, compared with contents recommended from the second recommendation logic.

2. The method according to claim 1, further comprising:
determining a first recommendation score for the first content according to content attribute data of the first content and viewer attribute data of the viewer, by the first recommendation logic;
determining the first recommendation score to be higher than a first threshold;
determining a second recommendation score for the second content according to content attribute data of the second content and the viewer attribute data of the viewer, by the second recommendation logic; and
determining the second recommendation score to be higher than a second threshold.

3. The method according to claim 2, further comprising:
determining a third recommendation score for the first content according to the content attribute data of the first content and the viewer attribute data of the viewer, by the second recommendation logic;
determining the third recommendation score to be lower than a third threshold;
determining a fourth recommendation score for the second content according to the content attribute data of the second content and the viewer attribute data of the viewer, by the first recommendation logic; and
determining the fourth recommendation score to be lower than a fourth threshold.

4. The method according to claim 2, further comprising:
determining a first mixed score for the first content according to the first recommendation score and the interaction data;
determining a second mixed score for the second content according to the second recommendation score and the interaction data; and
adjusting the allocation of contents from the first recommendation logic and the second recommendation logic according to the first mixed score and the second mixed score.

5. The method according to claim 1, wherein the adjusting the allocation of contents includes adjusting an order of contents from the first recommendation logic and the second recommendation logic to be shown on the user terminal.

6. The method according to claim 1, wherein the adjusting the allocation of contents includes adjusting respective numbers of contents from the first recommendation logic and the second recommendation logic to be shown on the user terminal.

7. The method according to claim 1, further comprising:
providing a first group of contents according to the first recommendation logic to the user terminal;
providing a second group of contents according to the second recommendation logic to the user terminal;
determining the viewer to have interacted more with the first group of contents according to the interaction data; and
adjusting the allocation of contents to display more contents from the first recommendation logic on the user terminal.

8. The method according to claim 1, wherein the interaction data includes click rates or retention lengths with respect to contents from the first recommendation logic and contents from the second recommendation logic.

9. A system for recommendation, comprising one or a plurality of processors, wherein the one or plurality of processors execute a machine-readable instruction to perform:
providing a first content according to a first recommendation logic to a user terminal of a viewer;
providing a second content according to a second recommendation logic to the user terminal, wherein the second recommendation logic is different from the first recommendation logic, and first content and the second content are displayed at the user terminal of the viewer at the same time;
obtaining interaction data from the user terminal;
calculating respectively a click rate and an average time length with respect to the first recommendation logic and the second recommendation logic based on the interaction data; and
adjusting an allocation of contents from the first recommendation logic and the second recommendation logic to be shown on the user terminal according to the interaction data, wherein the adjusting the allocation of contents comprises displaying more contents recommended from the first recommendation logic or displaying contents recommended from the first recommendation logic in a higher order, compared with contents recommended from the second recommendation logic.

10. A non-transitory computer-readable medium including a program for recommendation, wherein the program causes one or a plurality of computers to execute:
providing a first content according to a first recommendation logic to a user terminal of a viewer;
providing a second content according to a second recommendation logic to the user terminal, wherein the second recommendation logic is different from the first recommendation logic, and the first content and the second content are displayed at the user terminal of the viewer at the same time;
obtaining interaction data from the user terminal;
calculating respectively a click rate and an average time length with respect to the first recommendation logic and the second recommendation logic based on the interaction data; and
adjusting an allocation of contents from the first recommendation logic and the second recommendation logic to be shown on the user terminal according to the interaction data, wherein the adjusting the allocation of contents comprises displaying more contents recommended from the first recommendation logic or displaying contents recommended from the first recommendation logic in a higher order, compared with contents recommended from the second recommendation logic.

\* \* \* \* \*